United States Patent
Vollmer

(10) Patent No.: US 10,399,429 B2
(45) Date of Patent: Sep. 3, 2019

(54) DRIVE DEVICE FOR A MOTOR VEHICLE AND METHOD FOR OPERATING A DRIVE DEVICE

(71) Applicant: AUDI AG, Ingolstadt (DE)

(72) Inventor: Frank Vollmer, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 237 days.

(21) Appl. No.: 15/638,658

(22) Filed: Jun. 30, 2017

(65) Prior Publication Data

US 2018/0001758 A1   Jan. 4, 2018

(30) Foreign Application Priority Data

Jul. 2, 2016   (DE) .................. 10 2016 008 173

(51) Int. Cl.
| | |
|---|---|
| B60K 6/445 | (2007.10) |
| B60K 6/442 | (2007.10) |
| B60W 10/113 | (2012.01) |
| B60W 10/115 | (2012.01) |
| B60K 6/40 | (2007.10) |
| B60K 6/387 | (2007.10) |
| B60W 20/00 | (2016.01) |

(52) U.S. Cl.
CPC .............. B60K 6/445 (2013.01); B60K 6/387 (2013.01); B60K 6/40 (2013.01); B60K 6/442 (2013.01); B60W 10/113 (2013.01); B60W 10/115 (2013.01); B60W 20/00 (2013.01); *Y02T 10/6234* (2013.01); *Y02T 10/6239* (2013.01)

(58) Field of Classification Search
None
See application file for complete search history.

(56) References Cited

U.S. PATENT DOCUMENTS

| 8,380,376 B2 | 2/2013 | Akimoto | |
|---|---|---|---|
| 9,896,088 B2 * | 2/2018 | Miyagawa | ............. B60K 6/442 |

(Continued)

FOREIGN PATENT DOCUMENTS

| DE | 60029811 T2 | 3/2007 |
|---|---|---|
| DE | 102007032773 A1 | 6/2008 |

(Continued)

OTHER PUBLICATIONS

European Search Report dated Oct. 23, 2017 of corresponding European application No. 17177330.2; 8 pgs.

(Continued)

*Primary Examiner* — Jacob S. Scott
(74) *Attorney, Agent, or Firm* — Maier & Maier, PLLC

(57) ABSTRACT

A drive device and method for a motor vehicle, provided with a combustion engine machine, with a first electric machine and with a second electric machine, wherein a drive shaft of the combustion engine machine can be coupled by a first clutch to a drive shaft of the first electric machine, which is connected via a transmission drive to a drive shaft of the drive device. At the same time, the gear device is permanently coupled to the drive shaft of the first electric machine and provided with a planetary gear that can be coupled by a second clutch to the drive shaft of an internal combustion engine, wherein the second electric machine is permanently coupled to the drive shaft.

8 Claims, 1 Drawing Sheet

(56) References Cited

U.S. PATENT DOCUMENTS

| | | | | |
|---|---|---|---|---|
| 2011/0160015 A1* | 6/2011 | Ren | ................... | B60K 6/442 |
| | | | | 475/5 |
| 2016/0347307 A1* | 12/2016 | Banshoya | ............. | B60W 10/12 |
| 2017/0370446 A1* | 12/2017 | Steinberger | ............ | B60K 6/365 |
| 2018/0194214 A1* | 7/2018 | Oba | ................... | B60K 6/445 |

FOREIGN PATENT DOCUMENTS

| | | |
|---|---|---|
| DE | 102012214266 A1 | 2/2013 |
| DE | 10 2013 013 947 A1 | 2/2015 |
| DE | 102013013955 B3 | 2/2015 |
| DE | 112013007066 T5 | 2/2016 |
| EP | 1281557 A1 | 2/2003 |
| JP | 201216988 A | 1/2012 |

OTHER PUBLICATIONS

Examination Report dated Mar. 3, 2017 of corresponding German application No. 10 2016 008173.2; 10 pgs.

\* cited by examiner

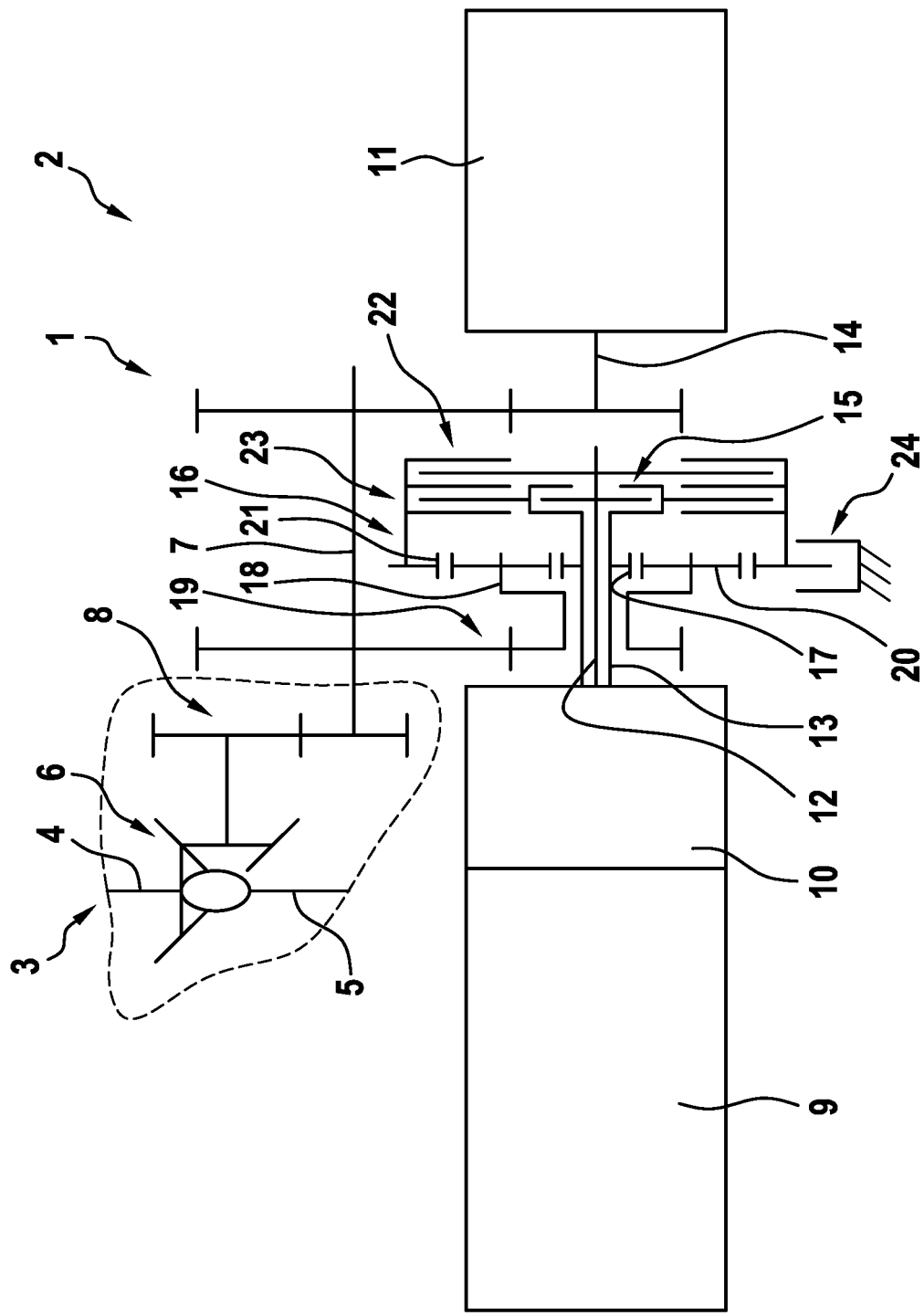

DRIVE DEVICE FOR A MOTOR VEHICLE AND METHOD FOR OPERATING A DRIVE DEVICE

FIELD

Embodiments of the invention relates to a drive device for a motor vehicle including an internal combustion engine, a first electric machine and a second electric machine, wherein a drive shaft of the internal combustion engine can be coupled by means of a first clutch that is connected via a transmission device to the drive shaft of the transmission device. Embodiments of the invention further also relate to a method for operating a drive device.

BACKGROUND

The drive device is used to drive the motor vehicle, and thus it also serves to provide a torque for driving the motor vehicle. The drive device is provided with a plurality of drive units, wherein the internal combustion engine represents a first drive unit of the drive units, the second electric machine represents a second drive unit of the drive units, and the second electric machine represents a third drive unit of the drive units. It goes without saying that drive units of another type could be also used instead of the internal combustion engine, the first electric machine and the second electric machine.

When the internal combustion engine is started, it must be first brought to a minimum rotational speed, for example from the standstill state. The minimum rotational speed in this case preferably corresponds to a number of rotations at which the internal combustion engine can be operated independently, which is to say without operating the internal combustion engine by applying an external torque. Based on this minimum rotational speed, the internal combustion engine is then further accelerated and its rotational speed can be further increased automatically.

The first electric machine is used to bring along the internal combustion engine and to this extent also to provide an external torque. For this purpose, the internal combustion engine or its drive shaft can be coupled to the first electric machine, or to its drive shaft, by means of the first clutch. This means that the operating connection between the internal combustion engine and the first electric machine is interrupted in the first switching position of the first clutch, while at least a second switching position is at least partially produced.

It is particularly preferred when the internal combustion machine and the first electric machine are rigidly coupled to one another in the second switching position of the first clutch. With the aid of the first clutch, the drive shaft of the internal combustion engine can be connected or coupled to the first electrical machine, wherein both of these terms are being used synonymously in the context of this description. Alternatively or additionally, the internal combustion engine can be coupled to the first electric machine via the second clutch, wherein blocking of the planetary gear may be necessary.

Furthermore, the first electric machine, or its drive shaft, is connected via the transmission device to the drive shaft of the drive device. The drive device can be for example a multi-gear transmission or a manual transmission, by means of which the transmission ratio can be selected from a plurality of transmission ratios so that the transmission ratio between the internal combustion engine and the output shaft can be adjusted.

For example, the transmission device can be provided in the form of an automatic transmission that has several gears, for instance at least four, at least five, at least six, at least seven or at least eight forward driving gears. However, such a configuration requires on the one hand a large amount of space in the motor vehicle, and on the other hand it is also complicated to implement.

It is therefore the object of the invention to propose a drive device for a motor vehicle which has advantages of known drive devices, in particular because it enables a more flexible operation of the drive device, while at the same time it also enables a significantly reduced amount of installation space.

SUMMARY

In this case, it is provided that the transmission device is equipped with a planetary gear that is permanently coupled to the drive shaft of the first electric machine and by means of the second clutch with a planetary gear that can be coupled with the drive shaft of the internal combustion engine, wherein the second electric machine is permanently coupled to the output shaft.

The transmission device is equipped with a planetary gear that is also configured as such. The planetary gear is usually provided with a sun wheel, with a planetary carrier, as well as with a ring wheel, wherein at least one planetary gear is rotatably mounted on the planetary gear, which meshes on the one hand with the ring wheel, and on the other hand with the sun wheel. The driver shaft of the first electric machine is thus permanently coupled, in particular rigidly coupled, to one of these elements, which is to say for example to the sun wheel, the ring wheel or the planetary gear. The coupling between the transmission device and the drive shaft of the first electric machine is thus carried out preferably directly, which is to say not through another gear. Instead, the element of the planetary gear can be connected directly to the drive shaft, or it can be arranged on it.

The drive shaft of the electric machine connected via the transmission device to the output shaft of the drive device, in particular permanently. It is preferred when this is carried out via the planetary gear, in particular only through the planetary gear. In this respect, the output shaft is coupled, for example permanently, to one of the elements of the planetary gear, while the first electric machine is permanently coupled to another of the elements of the planetary gear. The fact that the first electric machine is permanently connected via the transmission device to the drive shaft does not mean, in this respect, that an operational connection is present between the first electric machine and the drive shaft, in particular not a permanent one. Depending on the operation type of the drive device, it can be optionally provided with a suitable operation of the planetary gear that no torque will be transmitted between the electric machine and the drive shaft, which is to say to the extent that the internal combustion machine is decoupled from the drive shaft, so that the torque is not transmitted.

The transmission device can be coupled by means of the second clutch to the drive shaft. This means that in a first switching position of the second clutch, the transmission device is decoupled from the internal combustion engine, or from its drive shaft, and in a second switching position, it is at least partially connected to it, preferably rigidly. It can be provided that the starting operation or bringing along the internal combustion engine can be achieved by means of coupling, or connecting the internal combustion engine with the drive shaft.

Analogously to the embodiments of the first electric machine described above, the clutch of the drive shaft of the internal combustion engine to the planetary gear is configured in such a manner that it can be coupled to an element of the planetary gear, for example the sun wheel, the planetary carrier or the ring wheel.

It has been already mentioned above that the first electric machine can be coupled by means of the first clutch with the internal combustion engine. Accordingly, the internal combustion machine can be based on the permanent coupling of the transmission device that is coupled to the drive shaft of the first electric machine, as well as via the first clutch and via the second clutch to the transmission device with an operational connection. This can be preferably done independently of respective components, so that the internal combustion machine or its drive shaft can be connected with an operational connection either only via the first clutch, only via the second clutch, as well with the second clutch to the planetary gear.

The coupling of the internal combustion machine to the transmission device via the first clutch is in this case carried out always together with the first electric machine, while the internal combustion machine can be independently of the first electric machine in operational connection with the planetary gear with the aid of the second clutch. To sum up the options, it is therefore possible to couple with the aid of the first clutch and of the second clutch either the internal combustion engine, as well as the first electric machine, either jointly, or solely to the first electric machine, but not the internal combustion engine with the planetary gear.

Furthermore, it is provided that the second electric machine is permanently coupled to the drive shaft. The second electric machine is coupled permanently and non-detachably to the drive shaft, preferably in a rigid manner. A transmission stage can be provided for this purpose for example between the second electric machine or a drive shaft of the second electric machine and the output shaft. The transmission stage is equipped only with a single, non-exchangeable transmission ratio, so that the transmission ratio between the second electric machine and the output drive cannot be changed.

The output shaft is preferably coupled rigidly and/or permanently to a wheel axle, or at least to a wheel of the motor vehicle. This coupling can be produced for example via at least one differential gear, in particular an axle differential gear and/or a mid-range differential gear. In the operational connection between the output shaft and the wheel axle can be provided at least one transmission stage. However, it is preferred when the transmission ratio between the output shaft and the wheel axle or the wheel is not changeable, but instead is constant.

The output shaft can be coupled to the wheel axle and/or to the at least one wheel of the motor vehicle. The at least one wheel of the motor vehicle is preferable supported on the wheel axle. For example, the wheel axle is provided with several partial axles, wherein each of the partial axles is associated with at least one wheel of the motor vehicle, which is in particular rigidly attached to the relevant wheel axle. The partial axles of the wheel axle are preferably operationally connected via the axle differential transmission already mentioned above to the output shaft.

According to another preferred embodiment of the invention, the drive shaft of the first electric machine is permanently coupled to a sun wheel of the planetary gear. The sun wheel represents one of the elements of the planetary gear already mentioned above. The drive shaft is thus permanently and preferably rigidly connected with an operational connection to the to the sun wheel, in particular, the sun wheel rests directly on the drive shaft of the first electric machine.

According to a further embodiment of the invention, the drive shaft of the first electric machine can be coupled via a third clutch to the ring wheel of the planetary gear. Additionally to the first clutch and to the second clutch, a third clutch is thus also provided. In a first switching position of the third clutch, the drive shaft of the first electric machine is decoupled from the ring wheel, and in a second switching position it is coupled to it at least partially, in particular rigidly. Accordingly, the first electric machine or its drive can be on the one hand permanently coupled to the sun wheel of the planetary gear, and on the other hand it can be coupled via the third clutch to the ring wheel. When the third clutch is used, the planetary gear can be in this context blocked.

According to a preferred embodiment of the invention, the drive shaft of the internal combustion machine can be coupled via the second clutch to the ring wheel. With a closed second clutch, which is to when the second switching position of the second clutch is engaged, the drive shaft of the combustion engine machine is connected to the ring wheel, preferably rigidly, so that it has the same rotational speed.

According to another embodiment of the invention, the output shaft is permanently coupled to a planetary carrier of a planetary gear. As was already mentioned above, at least one planetary wheel of the planetary gear is rotatably mounted on the planetary carrier, which meshes on the one hand with the ring wheel, and on the other hand with the sun wheel. The planetary carrier is on the one hand rotatably mounted, in particular so that it is rotatably mounted coaxially with respect to the sun wheel and to the ring wheel. The planetary carrier is always permanently connected to the drive shaft with an operational connection, for example through a transmission stage. The transmission stage can be in this case provided with the same transmission ratio, for example between the second electric machine and the transmission stage that is provided for the output shaft. However, another transmission ratio can be also provided.

Within the scope of another embodiment of the invention, a first transmission ratio is provided between the output shaft and the planetary carrier, and a second transmission ratio is provided between the output shaft and the output shaft of the second electric machine. This was already pointed out. The transmission ratios can be achieved for example with a transmission stage. However, a direct coupling can be also provided.

According to another development of the invention, the second transmission ratio is different from the first transmission ratio. However, it goes without saying that as an alternative, the second transmission ratio can be also the same as the first transmission ratio.

According to another embodiment of the invention, braking can be applied to the ring wheel by means of a brake. The brake is used to brake the ring wheel, for example with respect to a stationary housing of the transmission device, for example a machine housing of the internal combustion engine, the first electric machine, or the second electric machine. In a first switching position of the brake, the ring wheel is preferably fully released, while it is braked or fully fixed in a second switching position.

Finally, in a further embodiment of the invention, it can be provided that the drive shafts of the internal combustion machine and of the first electric machine are arranged coaxially to each other. Said drive units of the drive device are in this respect arranged so that they are mutually adjacent in the axial direction, preferably partially, or even directly adjacent to one another. For example, the first electric machine is associated with the internal combustion engine, in particular so that a machine housing of the internal combustion engine is attached to a machine housing of the first electric machine.

The second electric machine is preferably arranged at a distance from the internal combustion machine and the first electric machine in the axial direction. For example—seen in the axial direction relative to an axis of ration of the drive shafts—the transmission device or the planetary gear are arranged between the internal combustion machine and the first electric machine on the one hand, and the second electric machine on the other hand, in particular between both electric machines. The second electric machine or its drive shaft can be also arranged coaxially to the drive shafts of the internal combustion machine and the first electric machine. However, an arrangement parallel to the axis or an inclined arrangement of the drive shaft of the second electric machine is preferred with respect to the drive shafts of the internal combustion and of the first electric machine.

The invention further also relates to a method for operating a drive device, in particular a drive device according to the embodiments mentioned above, wherein the drive device is provided with an internal combustion engine, with a first electric machine and with a second electric machine, wherein a drive shaft of the internal combustion machine can be coupled by means of a first clutch to a drive shaft of the first electric machine, which is connected via a transmission device to a drive shaft of the drive device. At the same time, the transmission device is provided with a planetary gear that is permanently coupled to the first electric machine, which can be coupled by means of a second clutch to the drive shaft of the internal combustion machine, wherein the second electric machine is permanently coupled to the drive shaft.

The advantages of such a configuration of the drive device or of such an approach have been already mentioned. Both the drive device and the method for operating the drive device can be further developed according to the embodiments mentioned above, so that reference is made to them in this regard.

BRIEF DESCRIPTION OF THE DRAWINGS

FIGURE The FIGURE shows a schematic illustration of a drive device for a motor vehicle.

DETAILED DESCRIPTION

The FIGURE shows a schematic representation of a drive device 1 for a motor vehicle 2, not shown in detail. The motor vehicle 2 is provided with a wheel axle 3 having two partial axles 4 and 5, which are coupled via an axle differential gear 6 both to each other and to an output shaft 7 of the drive device 1. An operating connection between the output shaft 7 and the axle differential gear 6 is in this case provided via a gear stage 8. However, it goes without saying that a direct coupling can be also provided.

The drive device 1 can provide a drive torque for driving the motor vehicle 2 via the output shaft 7. For this purpose, the drive device 1 is provided via an internal combustion engine 9 with a first electric machine and with a second electric machine 11. The internal combustion machine 9 is equipped with a drive shaft 12, while the first electric machine 10 is equipped with a drive shaft 13, and the second electric machine 11 is equipped with a drive shaft 14. The drive shafts 12 and 13 of the internal combustion machine 9 and of the first electric machine 10 can be mutually coupled to one another by means of a first clutch 15.

When the clutch 15 is closed or slipping, the internal combustion engine 9 can be brought along to start operating by means of the first electric machine 10, in particular at a minimum rotational speed of the internal combustion engine 9. The first electric machine 10 is in this case used as a starter for the internal combustion engine 9. Conversely, it goes without saying that the first electric machine 10 can be also operated as a generator and driven by means of the internal combustion engine 9.

The drive shaft 13 of the first electric machine 10 is connected via a transmission device 16, which is provided with a planetary gear or designed as a planetary gear, to the output shaft 7. In this case, a sun wheel 17 of the planetary gear is rigidly connected to the drive shaft 13 of the first electric machine 10, while the output shaft 7 is coupled to a planetary carrier 18, for example via a gear stage 19. At least one planetary wheel 20 is rotatably mounted on the planetary carrier 18. It meshes with the sun wheel 17 on the one hand, and on the other hand with the ring wheel 21 of the planetary gear. In summary, the transmission device 16 or the planetary gear are permanently connected or coupled to the drive shaft 13 of the first electric machine.

In addition to the first clutch 15, a second clutch 22 is also provided. In this manner, an operational connection can be established between the drive shaft 13 of the internal combustion engine 9 and the planetary gear, in particular the ring wheel 21 of the planetary gear. Additionally, the drive shaft 13 of the first electric machine 10 can be coupled to the ring wheel with the aid of a third clutch. When the third clutch 23 is closed, both the sun wheel 17 and the ring wheel 21 are coupled to the drive shaft 13 of the first electric machine 10, so that the planetary gear is blocked. In addition, a brake 24 also makes it possible to brake the ring wheel 21.

The following operating modes are obtained by means of the configuration of the drive device 1 described above: with the aid of the first clutch 15, the drive shafts 12 and 13 of the internal combustion engine 9 and of the first electric machine 10 can be coupled in order to start a hybrid operation of the drive device 1, or to operate the drive device 1 as a serial hybrid drive device 1. With the aid of the second clutch 22, which connects the internal combustion engine machine 9 or its drive shaft 12 to the ring wheel 21, a variable-speed operating range can thus be realized.

The third clutch 23, on the other hand, is used to block the planetary gear, so that a second driving gear is provided in this respect. If the ring gear 21 is fixed by means of the brake 24, the drive shaft 7 can be driven solely by means of the combustion engine 9 by closing the first clutch 15, wherein a first driving gear is provided which has a transmission ratio that is different from the second driving gear.

The drive device 1 described above is provided with a very compact transmission 16, which nevertheless makes it possible to use the drive device 1 over the entire intended operating range of the motor vehicle. Overall, the drive device is thus characterized by the fact that a small installation space is required, as well as by a small weight, while a high flexibility is also achieved.

The invention claimed is:

1. A drive device for a motor vehicle, comprising:
   a combustion engine machine, a first electric machine and a second electric machine, wherein a drive shaft of the combustion engine machine can be coupled by a first clutch to a first drive shaft of the first electric machine, which is connected via a transmission device to an output shaft of the drive device, wherein the second electric machine is permanently coupled to the output shaft and the transmission device is provided with a planetary gear that is permanently coupled to the first drive shaft of the first electric machine, wherein the planetary gear can be coupled by a second clutch to the drive shaft of the combustion engine machine, wherein the first drive shaft of the first electric machine can be coupled via a third clutch to a ring wheel of the planetary gear, and wherein the planetary gear is arranged in the axial direction relative to the axis of rotation of the drive shafts between the combustion engine machine and the first electric machine, and the second electric machine.

2. The drive device according to claim 1, wherein the first drive shaft of the first electric machine is permanently coupled to a sun wheel of the planetary gear.

3. The drive device according to claim 1, wherein the drive shaft of the combustion engine machine can be coupled via the second clutch to the ring wheel.

4. The drive device according to claim 1, wherein the output shaft is permanently coupled to a planetary carrier of the planetary gear.

5. The drive device according to claim 4, wherein a first transmission ratio is provided between the output shaft and the planetary carrier, and a second transmission ratio is provided between the output shaft and the drive shaft of the second electric machine.

6. The drive device according to claim 1, wherein the ring wheel can be braked by means of a brake.

7. The drive device according to claim 1, wherein the drive shafts of the combustion engine machine and the first electric machine are arranged mutually coaxially to one another.

8. A method for operating a drive device, comprising:
an internal combustion engine, with a first electric machine and with a second electric machine, wherein a drive shaft of the internal combustion engine can be coupled by a first clutch to a first drive shaft of the first electric machine, which is connected via a transmission device to an output shaft of the drive device, wherein the second electric machine is permanently coupled to the output shaft and the drive device is provided with a planetary gear of the first electric machine that is permanently coupled to the first drive shaft, wherein the planetary gear can be coupled by a second clutch to the drive shaft of the internal combustion engine, wherein the first drive shaft of the first electric machine can be coupled via a third clutch to a ring wheel of the planetary gear, and wherein the planetary gear is arranged in the axial direction relative to a rotational axis of the drive shafts between the internal combustion engine and the first electric machine and the second electric machine.

\* \* \* \* \*